United States Patent [19]

Shimizu

[11] Patent Number: 5,485,200
[45] Date of Patent: Jan. 16, 1996

[54] OPERATIONAL INFORMATION RENEWING AND MEMORIZING APPARATUS AND METHOD FOR A PHOTOGRAPHING INSTRUMENT

[75] Inventor: Hitoshi Shimizu, Omiya, Japan

[73] Assignee: Asahi Kogaku Kogyo Kabushiki Kaisha, Tokyo, Japan

[21] Appl. No.: 293,647

[22] Filed: Aug. 22, 1994

Related U.S. Application Data

[63] Continuation of Ser. No. 813,985, Dec. 26, 1991, abandoned.

[30] Foreign Application Priority Data

Dec. 26, 1990 [JP] Japan ................................ 2-404736 U
Dec. 26, 1990 [JP] Japan ................................ 2-414199

[51] Int. Cl.[6] ................................................ H04N 5/225
[52] U.S. Cl. ..................... 348/207; 348/341; 348/345; 348/362
[58] Field of Search ............................... 348/207, 220, 348/239, 375, 335, 341, 345, 362; 354/219, 223; 358/335, 906; H04N 5/225

[56] References Cited

U.S. PATENT DOCUMENTS

| | | | |
|---|---|---|---|
| 4,466,721 | 8/1984 | Detuzzi | 354/267.1 |
| 4,746,993 | 5/1988 | Tada | 348/232 |
| 4,982,291 | 1/1991 | Kurahashi et al. | 358/335 |
| 5,124,814 | 6/1992 | Takahashi et al. | 358/906 |
| 5,146,353 | 9/1992 | Isoguchi et al. | 348/232 |
| 5,212,556 | 5/1993 | Ogawa | 348/207 |

Primary Examiner—Joseph Mancuso
Assistant Examiner—Tuan V. Ho
Attorney, Agent, or Firm—Kane, Dalsimer, Sullivan, Kurucz, Levy, Eisele and Richard

[57] ABSTRACT

The present invention relates to an operational information renewing and memorizing apparatus and method for a photographing instrument. In more detail, one example is a function renewing and memorizing apparatus and method for a still video apparatus which memorizes or reproduces a still picture, comprising a picture display device for displaying information relating to functions for recording and reproducing, a selecting device for selecting a predetermined function from the information displayed on the picture display device, a memory device for memorizing the information of said function selected by the selecting device.

15 Claims, 7 Drawing Sheets

OPERATIONAL INFORMATION RENEWING AND MEMORIZING APPARATUS AND METHOD FOR A PHOTOGRAPHING INSTRUMENT

This application is a continuation of application Ser. No. 07/813,985, filed Dec. 26, 1991, now abandoned.

BACKGROUND OF THE INVENTION

The present invention relates to an operational information renewing and memorizing apparatus and method for a photographing instrument such as a still video apparatus, a camera and so on.

Conventionally, a still video apparatus is constructed to memorize image information picked up from an image sensor in a recording medium such as a magnetic disk and so on, and to reproduce it as need arises. Moreover, the conventional still video apparatus is equipped with a plurality of operation switches corresponding to various functions and their operation modes.

As explained above, since the conventional still video apparatus has a plurality of operation switches for selecting various functions and their operation modes, therefore, total number of operation switches increases as the number of functions to be set and their operation modes increases, thus there is a problem such that the conventional still video apparatus has not been handy to operate.

On the other hand, the present invention also relates to a method for a photographing instrument which is capable of adjusting photographing conditions on the basis of the data which are previously set.

Conventionally, there has been proposed a camera which can memorize, as the set data, the photographing conditions such as a degree of diaphragm, a shutter speed and so on in the recording medium, and reads in these data to automatically adjust the mechanism portions of the camera to the suitable conditions. That is, a memory medium such as a ROM (i.e. Read Only Memory) or an IC card to which data relating to photographing conditions are memorized is installed in the camera, and the memorized data are read in a data reading portion which is arranged in the camera main body, then, the mechanism portions of the camera such as the diaphragm and the shutter are automatically adjusted on the basis of the memory data in the memory medium.

By using this kind of conventional camera, a photographer who is not familiar with the technology of photography can easily enjoy taking a photograph using a highly advanced photographic technology such as a daylight synchronized flash photographing.

However, the data memorized in the memory medium in the conventional camera has been not reloadable, it was therefore not possible to set special photographing conditions which a photographer intends to set occasionally and precisely in accordance with photographing circumstances, thus causing a deficiency such that the photographer cannot obtain the photograph which he or she intended, and as a result, the photographing was not satisfied with some photographers who are not familiar with the advanced photographing technology and, needless to say, beginners.

SUMMARY OF THE INVENTION

The present invention is contrived in light of the above-mentioned circumstances, and it is therefore a primary object of the present invention to provide an operational information renewing and memorizing apparatus and method for a photographing instrument in which the user can easily and precisely operate.

In order to achieve the above primary object, according to a first aspect of the present invention, there is provided an operational information renewing and memorizing apparatus for a photographing instrument, which comprises memory means for memorizing operational information for operating the photographing instrument, displaying means for displaying the operational information, and renewing means for renewing the operational information memorized in the memory means.

In order to achieve the above primary object, according to a second aspect of the present invention, there is provided an operational information renewing and memorizing method for a photographing instrument, which comprises steps of displaying operational information utilized for operating the photographing instrument, renewing the operational information, and memorizing the operational information.

Furthermore, it is a secondary object of the present invention, to provide a function renewing and memorizing apparatus and method for a still video apparatus which is capable of easily and accurately setting various functions and their operation modes.

In order to achieve the above secondary object, according to a third aspect of the present invention, there is provided a functional renewing and memorizing apparatus for still video camera, which comprises display means for displaying information relating to functions for recording and reproducing, selecting means for selecting a predetermined function from the information displayed on the picture display means, and memory means for memorizing the information of the function selected by said selecting means.

In order to accomplish the above secondary object, according to a fourth aspect of the present invention, there is provided a functional renewing and memorizing method for a still video camera, comprises steps of displaying information relating to functions for recording and reproducing, selecting a predetermined function from the information displayed in the displaying step, and memorizing the information of said function selected in said selecting step.

Still further, it is a another object of the present invention to provide a setting data renewing and memorizing apparatus and method for a moving picture camera which is capable of renewing the setting data relating to the photographing conditions and enabling the camera to perform the photographing on the basis of the renewed setting data.

In order to attain the another object, according to a fifth aspect of the present invention, there is provided a setting data renewing and memorizing apparatus for a moving picture camera, which comprises camera means including a camera mechanism having a diaphragm and a shutter, and a control circuit for adjusting an operation of the camera mechanism on the basis of a pre-memorized setting data, data renewing means for renewing the setting data by manual operation, display means for displaying the setting data which is provided in either of the camera means or the data renewing means, and memory means for memorizing the setting data.

In order to accomplish the another object, according to a sixth aspect of the present invention, there is provided a setting data renewing and memorizing method for a moving picture camera, which comprises steps of displaying information relating to functions for recording and reproducing, selecting a predetermined function from the information displayed in the displaying step, and memorizing the information of said function selected in said selecting step.

The above, and other objects, features and advantages of the present invention will become apparent from the following detailed description which is to be read in conjunction with the accompanying drawings.

BRIEF DESCRIPTION OF THE ACCOMPANYING DRAWINGS

DETAILED DESCRIPTION OF THE PREFERRED EMBODIMENTS

Hereinafter, referring now to the accompanying drawings, the preferred embodiments of the present invention are explained in detail.

FIGS. 1 to 5 are views showing a first embodiment of a still video apparatus.

Figure 1:
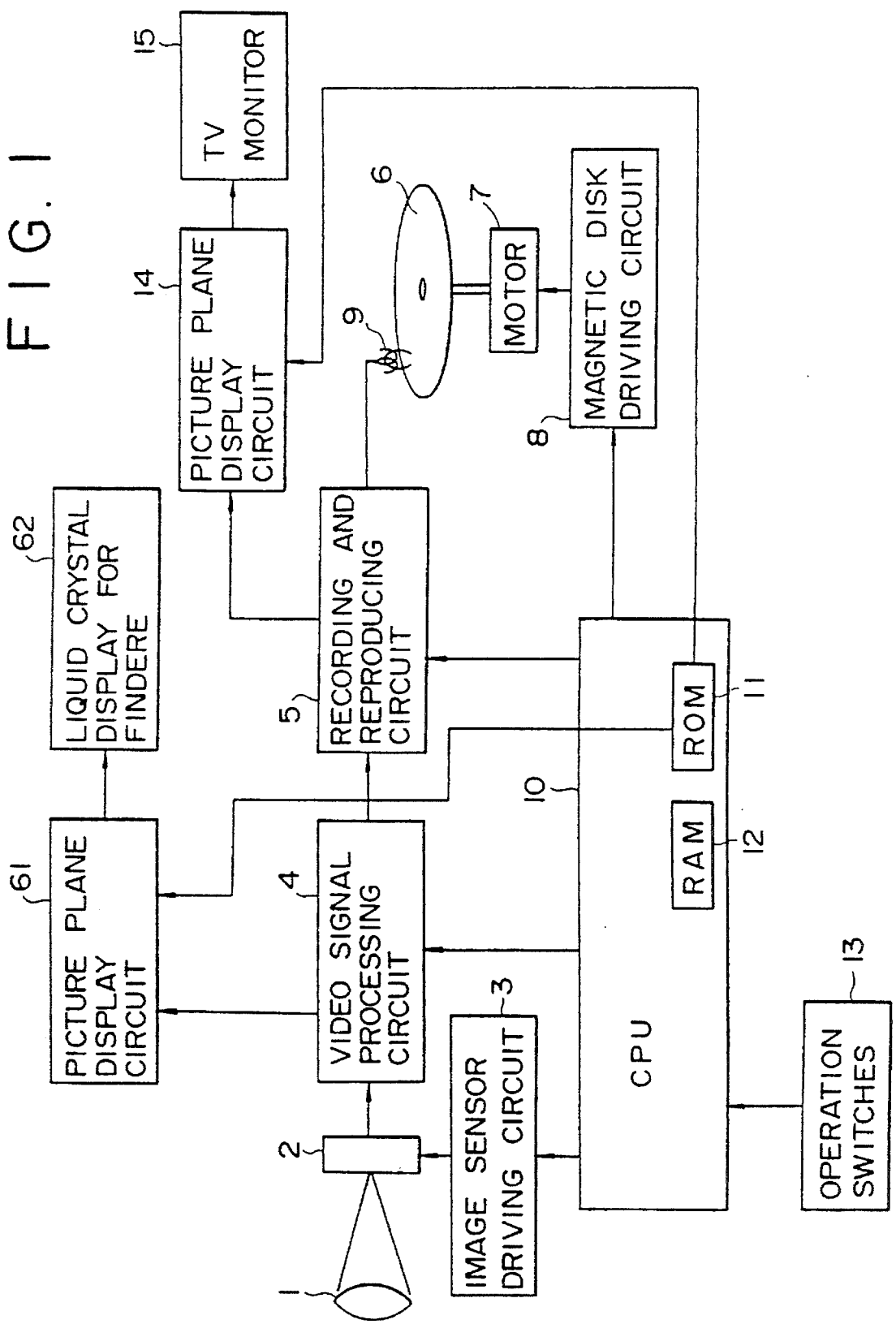
FIG. 1 is a block diagram showing an internal constitution of a first embodiment of a still video apparatus in accordance with the present invention.

As shown in FIG. 1, a lens 1 is provided for focusing an image of a subject onto an image sensor 2. The image sensor 2 transfers this image into an electric signal. Connected to the image sensor 2 is an image sensor driving circuit 3 which controls a scanning action of the image sensor 2. Also connected to the image sensor 2 is a video signal processing circuit 4 which transfers the electric signal outputted from image sensor 2 into a video signal of a predetermined mode; for example, NTSC mode.

Connected to the video signal processing circuit 4 is a recording and reproducing circuit 5 which modulates the video signal from the video signal processing circuit 4 to a signal being capable of recording onto a magnetic disk 6 and outputs the modulated signal to a magnetic head 9, and demodulates a signal read out from the magnetic disk 6 through the magnetic head 9 and outputs the demodulated signal to a picture plane display circuit described later. The magnetic disk 6 is a recording medium to which the video signal is recorded and from which the video signal is read out or picked out.

The magnetic disk 6 is rotated by a drive motor 7 at a predetermined speed. Connected to the motor 7 is a magnetic disk driving circuit 8 which controls the rotational speed of the motor 7. The magnetic head 9 records the video signal onto the magnetic disk 6 as well as reads out the recorded video signal from the magnetic disk 6.

A CPU 10 is provided for controlling each of the image sensor driving circuit 3, the video signal processing circuit 4, the recording and reading out circuit 5, and the magnetic disk driving circuit 8. The CPU 10 is included with a ROM 11 and a RAM 12 therein. The ROM 11 memorizes images of selection picture planes; i.e. menu picture planes, for setting various functions and their operation modes as well as programs required for causing the CPU 10 operate. The RAM 12 memorizes the functions and their operation modes which are set on the basis of the selection of the selection picture planes.

Connected to the CPU are a various operation switches 13 which include a shutter button, a reproduction switch, an UP/DOWN key, a MODE key, a HELP key and so on.

Connected to both of the recording and reproducing circuit 5 and the ROM 11 of the CPU 10 is the picture plane display circuit 14 which outputs both the video signal of the still picture output from the recording and reproducing circuit 5 and the video signal of the selection picture planes output from the ROM 11 to a TV monitor 15, and displays them on the TV monitor 15.

Also connected to both of the video signal processing circuit 4 and the ROM 11 of the CPU 10 is the other picture plane display circuit 61 which outputs both the video signal output from the video signal processing circuit 4 and the video signal of the selection picture planes output from the ROM 11 to a liquid crystal display 62 for a finder of the still video apparatus.

Figure 2:
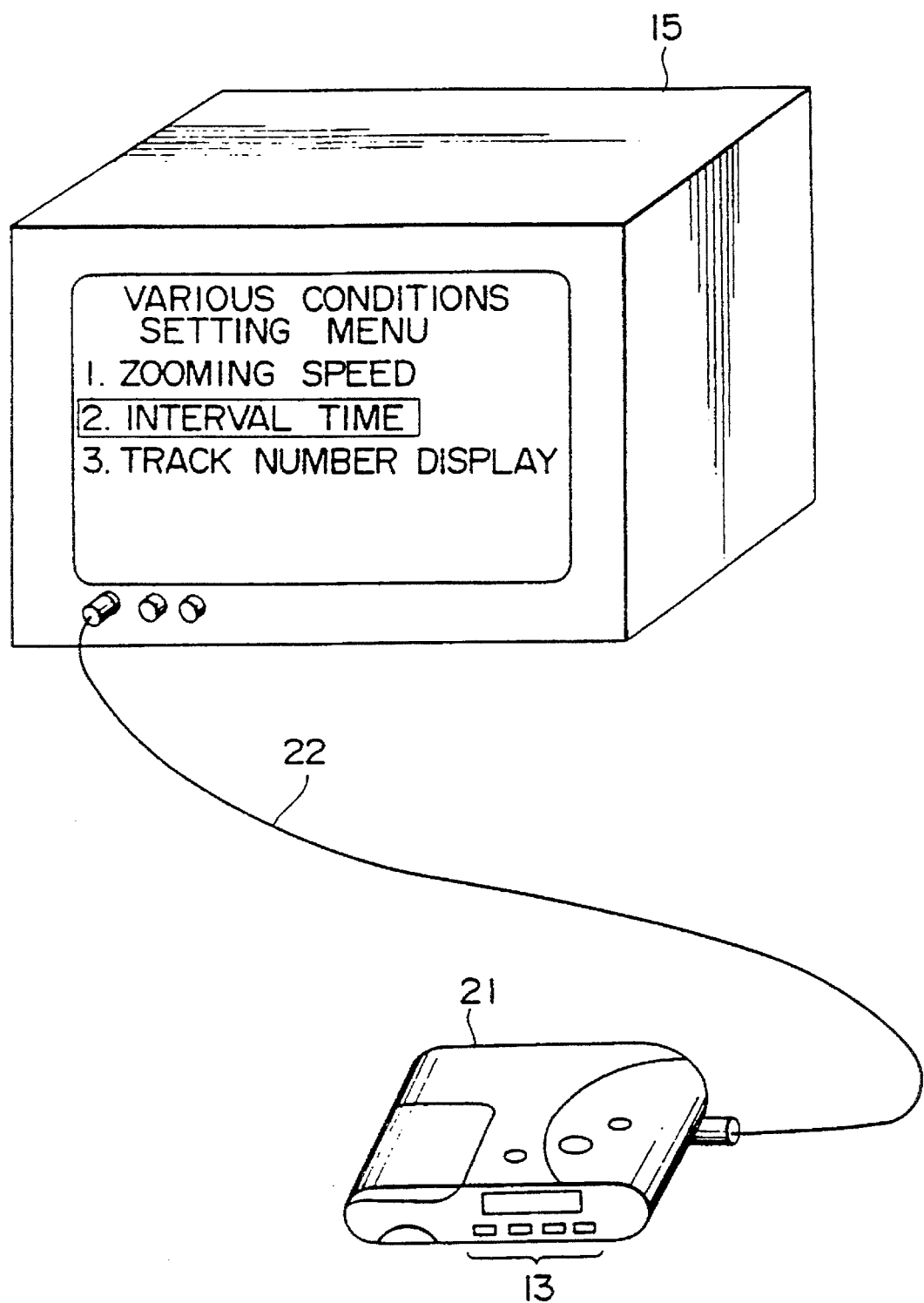
FIG. 2 is a perspective view showing a construction of the first embodiment of the still video apparatus in accordance with the present invention.

FIG. 2 is a view showing the first embodiment wherein a main body 21 and a TV monitor 15 of the still video apparatus are connected with each other through a transmission line 22.

Hereinafter, on the basis of the above arrangement, the operation of the still video apparatus will be explained in detail. First of all, explained below is the case that the still picture image is recorded onto the magnetic disk 6.

At first, when the still video apparatus is switched on or actuated, the CPU 10 outputs an actuation command signal to the image sensor driving circuit 3. In response to this signal, the image sensor driving circuit 3 actuates the image sensor 2 to commence a scanning operation. The image sensor 2 transfers the image entered through the lens 1 into the electrical signal, and outputs this electrical signal to the video signal processing circuit 4. The video signal processing circuit 4 transfers the input electrical signal into, for example, the video signal of the NTSC type.

In this instance, an operator can monitor the video signal processed in the video signal processing circuit 4 through a view finder (not shown) using a display means of, for example, a liquid crystal display 62.

Then the operator operates the shutter button among the operation switches 13 at a desirable timing while looking into the finder. With this shutter operation, the CPU 10 feeds the output command signal to the video signal processing circuit 4. Furthermore, The CPU 10 feeds an actuation command signal to the magnetic disk driving circuit 8 at the substantially same timing as this shutter operation. The magnetic disk driving circuit 8 controls the motor 7 to rotate so as to turn the magnetic disk 6 at a predetermined turning speed upon receiving the actuation command signal.

On the other hand, when the video signal processing circuit 4 receives the output command signal, it feeds the video signal; i.e. a still picture signal, to the recording and reproducing circuit 5. The recording and reproducing circuit 5 modulates this image signal into an frequency modulation signal (an FM signal), and records the FM signal through the magnetic head 9 onto the magnetic disk 6 during it keeps turning.

Then, explained hereinafter will be the case that the video signal is read out from the magnetic disk 6.

It should be noted that, as shown in FIG. 2, the main body 21 of the still video apparatus is connected to the TV monitor 15 through the transmission line 22.

The operator operates the reproduction switch among the operation switches 13. At this moment, the CPU 10 feeds the actuation command signal to the magnetic disk driving circuit 8. The magnetic disk driving circuit 8 controls, when received the actuation command signal, the rotational speed of the motor 7 so that the magnetic disk 6 turns at a predetermined turning speed. The magnetic head 9 reads out the FM signal from the magnetic disk 6 while the magnetic disk 6 keeps turning, feeds this read signal to the recording and reproducing circuit 5. The recording and reproducing circuit 5 demodulates the received FM signal into the demodulated video signal, and feeds it to the picture plane display circuit 14 as a video signal. The picture plane display circuit 14 feeds the video signal to the TV monitor 15 and the TV monitor 15 displays it.

In this manner, the video signal from the magnetic disk 6 is reproduced in the recording and reproducing circuit 5, and is displayed on the monitor.

Figure 3:
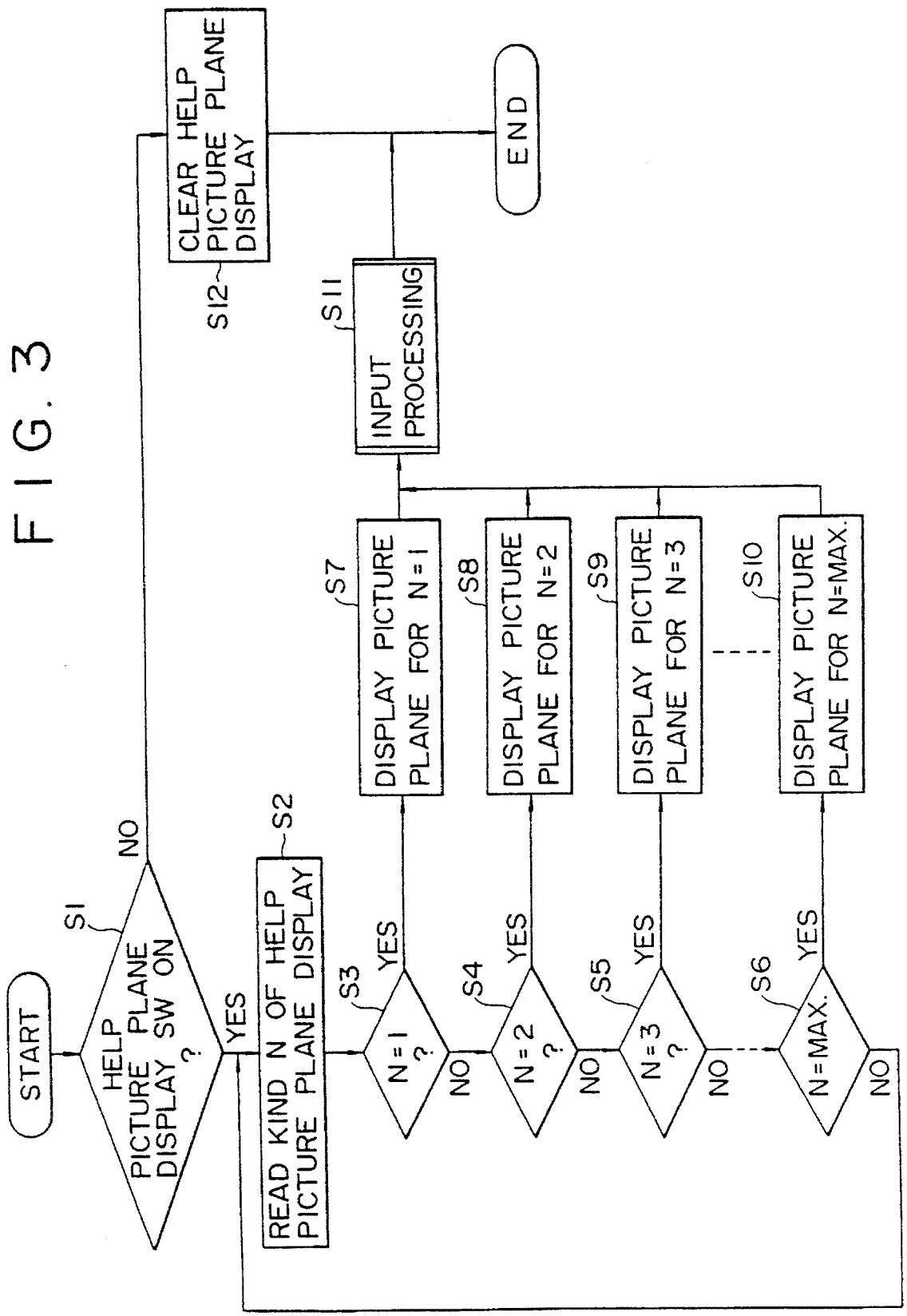
FIG. 3 is a flow chart illustrating an overall operation of the first embodiment of the still video apparatus in accordance with the present invention.
Figure 4:
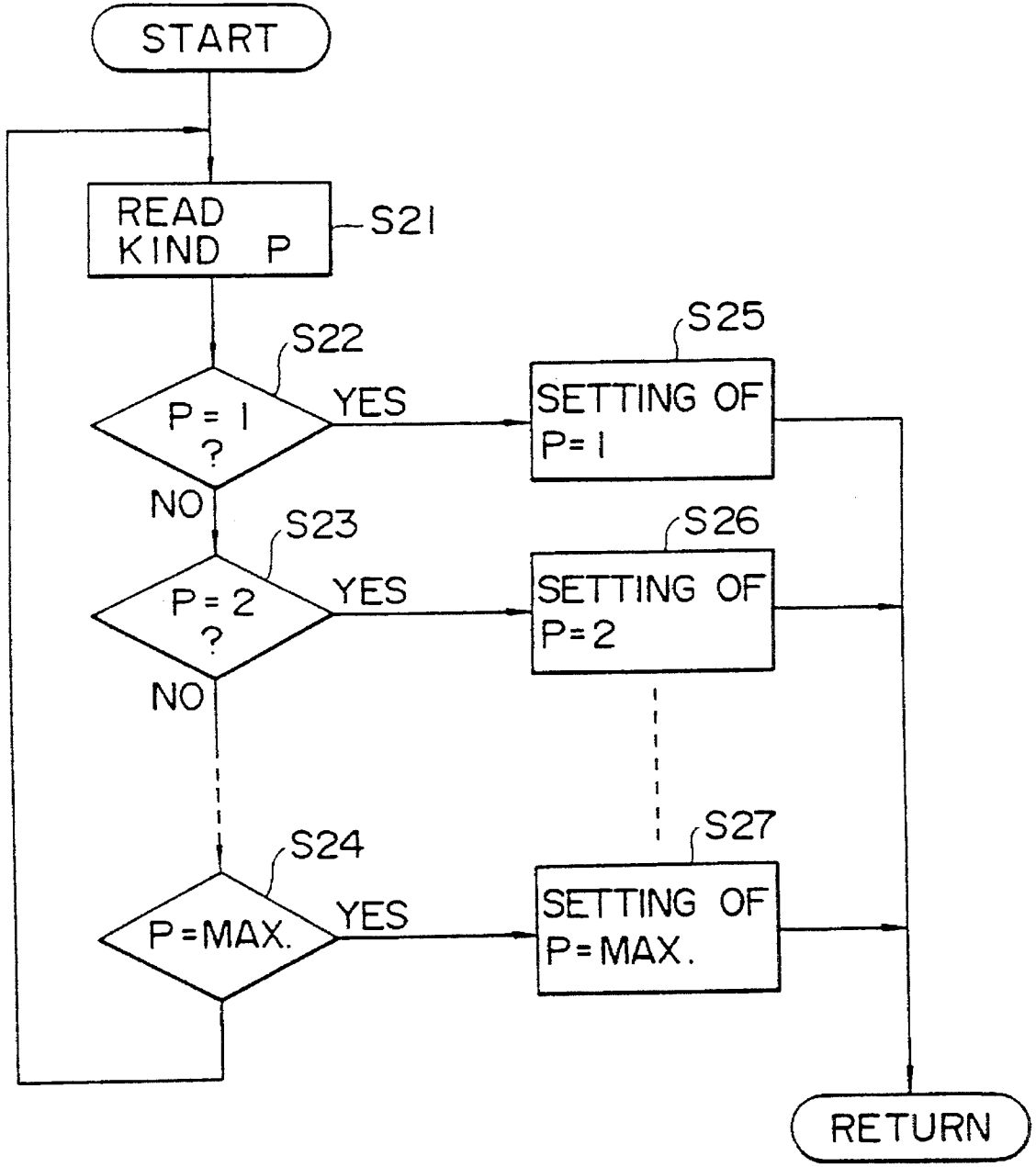
FIG. 4 is a flow chart illustrating a setting action of the first embodiment of the still video apparatus in accordance with the present invention.
Figure 5:
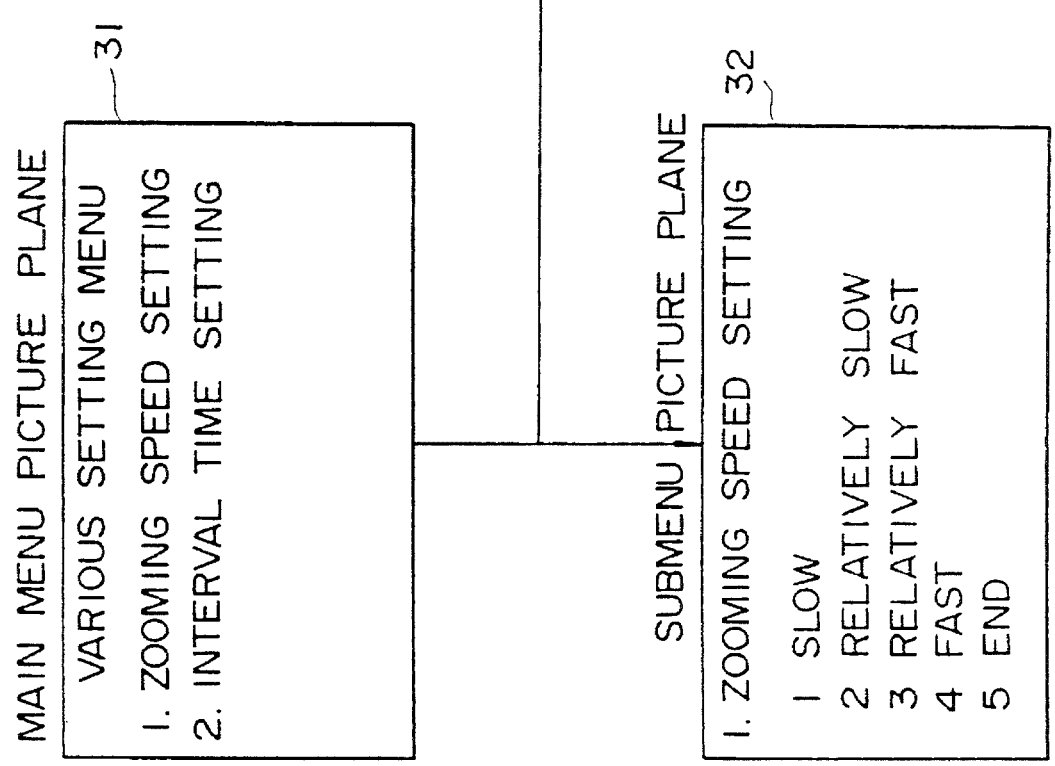
FIG. 5 is a view showing a display utilized for a menu picture plane in the first embodiment of the still video apparatus in accordance with the present invention.

Next, the method to set the various functions and their operation modes in the still video apparatus will be explained. FIGS. 3 and 4 are flow charts illustrating the setting method of the various functions and their operation modes. FIG. 5 is an actual display scope as a sample for the menu picture plane which is used in the setting operation of the various functions and their operation modes.

In this example, actually listed functions as the various function include, for example, a zoom speed at which the focal length of the lens is moved when the operator touches the zoom switch among the operation switches 13, an interval period of time which indicates a display time during which each of a plurality of still pictures continuously reproduced from the magnetic disk 6 is displayed, and a track number display which shows a number of a track of the magnetic disk 6 in which the still picture is recorded, and so on.

When the operator depressed the HELP key among the operation switches 13, it is judged that the HELP picture plane display switch is in an ON state at a step S1. In this instance, the CPU 10 feeds a main menu picture plane data which is memorized in the ROM 11 to picture plane display circuit 14, and causes the TV monitor 15 to display a main menu picture plane 31; i.e. a various setting menu picture plane as shown in FIG. 5 in a step S2. When the HELP key is not depressed, the main menu picture plane is prohibited to be displayed in a step S12.

When the main menu picture plane is displayed, the operator can choose any one of functions which is displayed on the various setting menu picture plane 31; for example, 1. setting of the zoom speed, and 2. setting of the interval period of time, by depressing the UP/DOWN key among the operation switches 13.

The CPU 10 then reads in a kind N of the selected function in a step S2. The kind N is, for example, designated to be 1 in case of the zoom speed setting and to be 2 in case of the interval setting, and the maximum number of the kind N corresponds to the total number of the functions.

The number of the kind N of the selected function is judged through steps S3 to S6, and the CPU 10 proceeds to any one of steps S7 to S10 according to the judged number of the kind N. In the step S7 to S10, a picture plane in accordance with the value of the kind N is selectively displayed. For example, when it is judged that the number N is set to 1, a sub menu picture plane; i.e. a picture plane of the action mode, in accordance with N=1 is displayed in the step S7. In this case, N=1 corresponds to the setting of the zoom speed, therefore the displayed picture plane is a picture plane 32 for the zoom speed setting.

On the other hand, when it is judged that the value N is set to 2; i.e. N=2, an another sub menu picture plane; i.e. an another picture plane of the operation mode, in accordance with N=2 is displayed in the step S8. In this case, N=2 corresponds to the setting of the interval period of time, therefore the displayed picture plane is a picture plane 33 for the interval setting as shown in FIG. 5.

In the same way, the CPU 10 causes the picture plane display circuit 14 to display the picture plane for each of various functions in accordance with the value of the kind N.

After the sub menu is displayed, the CPU 10 proceeds to an input process in a step S11. The detail of the condition input process in the step S11 is shown as a subroutine in FIG. 4.

As shown in FIG. 4, the operator chooses any one of operation modes displayed on the sub menu picture plane by depressing the UP/DOWN key, the numeric keys and so on. The CPU 10 reads in an input number of a kind P representing the selected operation mode in a step S21. When the sub menu picture plane for the zoom speed setting 31 is selected, for example, P=1 means "slow", P=2 means "relatively slow", P=3 means "relatively fast", P=4 means "fast", and P=5 means "end". To the contrary, when the sub menu picture plane is selected to the interval setting 33, for example, P=1 means "5 seconds", P=2 means "10 seconds", P=3 means "15 seconds", P=4 means "20 seconds", and P=5 means "end" as shown in FIG. 5.

After the input number of the kind P of the operation mode is read in at the step 21, the input number of the kind P is judged in succeeding steps S22 to S24. The CPU 10 carries out steps S25 to S27 for the setting in response to the judged number of the kind P. The setting means to memorize the operation mode of the function in the RAM 12. In the case that it is judged that P equals to be 5; i.e. P is maximum, the set contents is not changed in the step 27, and the process proceeds. After the steps 25 through 27 are executed, the all processes of the sub-routine are executed and returned to the main routine.

As is previously explained, the setting of the functions and their operation modes of the still video apparatus is accomplished.

It would be clear that the present invention is not limited to the embodiment described above, nor those illustrated in the drawings, and the invention can be modified without departing from the spirit and scope of the claimed invention.

Figure 6:
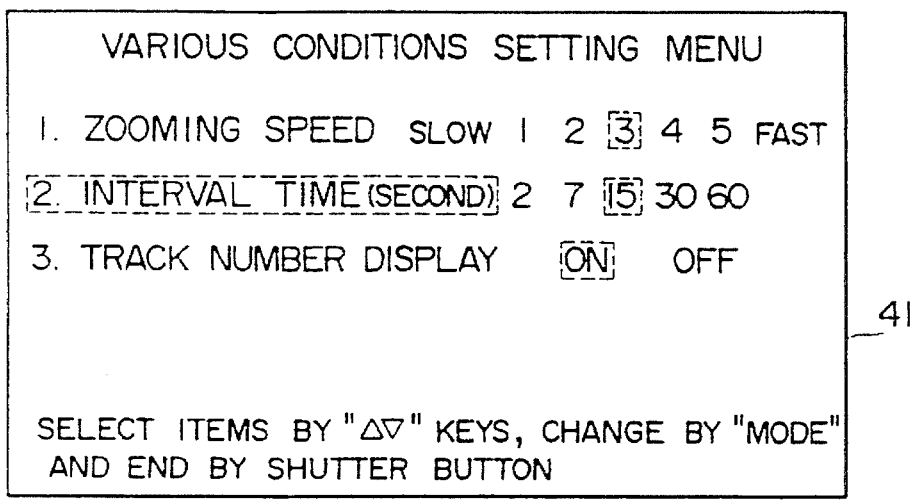
FIG. 6 is a view showing a display utilized for a menu picture plane in a second embodiment of the still video apparatus in accordance with the present invention.

Though, the above embodiment is explained as the menu picture plane is displayed by being divided into the main menu picture plane and the sub menu picture plane, it may be possible to display both the functions and their operation modes on the same picture plane at the same time as shown in FIG. 6 as a second embodiment. That is, in this second embodiment of the still video apparatus in accordance with the present invention, after a various condition setting menu 41 is displayed, the operator chooses the function, for example, by the UP/DOWN key, and also chooses its operation mode, for example, by the MODE key. After completing respective choice of the function and the operation mode, the selected condition is finally set when the operator depresses the shutter button.

Figure 7:
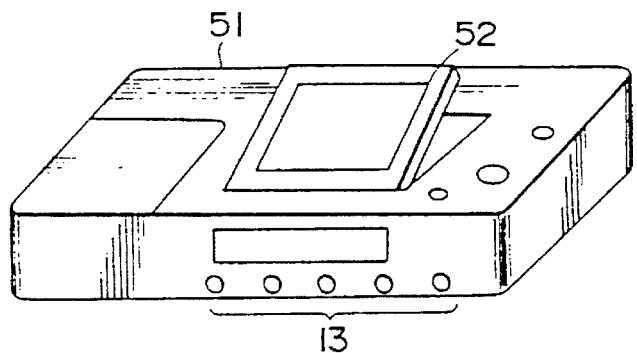
FIG. 7 is a perspective view showing a construction of a third embodiment of the still video apparatus in accordance with the present invention.

Moreover, though the still video apparatus in accordance with the above first and second embodiments is constructed in such a manner that the TV monitor and the still video apparatus are connected by the transmission line to each other, it may be possible to constitute the still video apparatus shown in FIG. 7 as a third embodiment. That is, in accordance with this third embodiment, a liquid crystal TV monitor 52 is integrally provided to the still video apparatus 51.

Further, though the display of the menu picture plane in accordance with the previously explained embodiments has been proposed to be performed through the TV monitor connected to the still video apparatus or the liquid crystal TV monitor integrally provided to the still video apparatus, the method of display is not limited to those and, for example, it may be further possible to perform the display on the liquid crystal display 62 for the viewfinder through the picture plane display circuit 61 as shown in FIG. 1.

Figure 8:
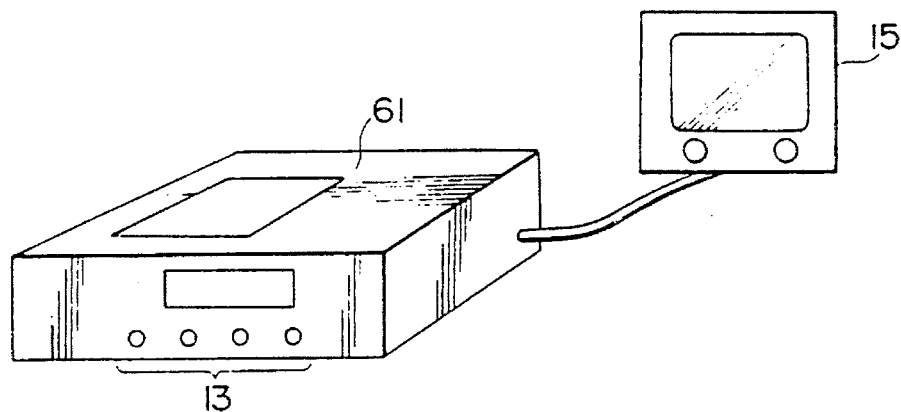
FIG. 8 is a perspective view showing a construction of a fourth embodiment of the still video apparatus in accordance with the present invention.

Still further, in the above embodiments, though the still video apparatus is constituted to be integrally formed with the camera, it may be possible to constitute the still video apparatus as a recording and reproducing machine 61 which is independent of a camera portion, as shown in FIG. 8 as a fourth embodiment. It should be noted that the description of the camera portion is omitted in FIG. 8.

Yet further in the above embodiment, though the content of the display is limited to the functions and their operation modes, it may be possible to add a display of an explanation of each function.

As is explained in the foregoing description, the still video apparatus in accordance with the present invention displays the information relating to the functions such as recording or reproducing and enables the operators to select a desirable one which they want, therefore it can provide such an advantageous effect that the operator can easily and accurately perform the setting for various functions and their operation modes.

Figure 9:
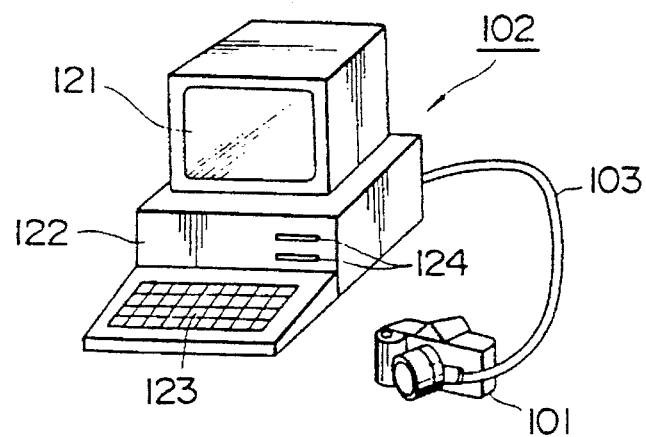
FIG. 9 is an exterior view of the photographing apparatus in accordance with a fifth embodiment of the present invention.

In accordance with an another aspect of the present invention, a fifth embodiment of the present invention will be described in detail with reference to FIGS. 9 and 10. In FIG. 9, an exterior view of the photographing apparatus according to the fifth embodiment is shown. In this photographing apparatus, a camera main body 101 and a computer 102 are connected with a cable 103. The cable 103 is detachably connected with the camera 101 and the computer 102 by means of a connector (not shown).

The computer 102 is constituted by a main body 122 having a display unit 121 and a slot 124 for installing a memory medium such as a floppy disk, and a keyboard 123. Setting data of photographing conditions which are read in from the memory medium and operation content of the keyboard 123 are displayed on the display unit 121.

Figure 10:
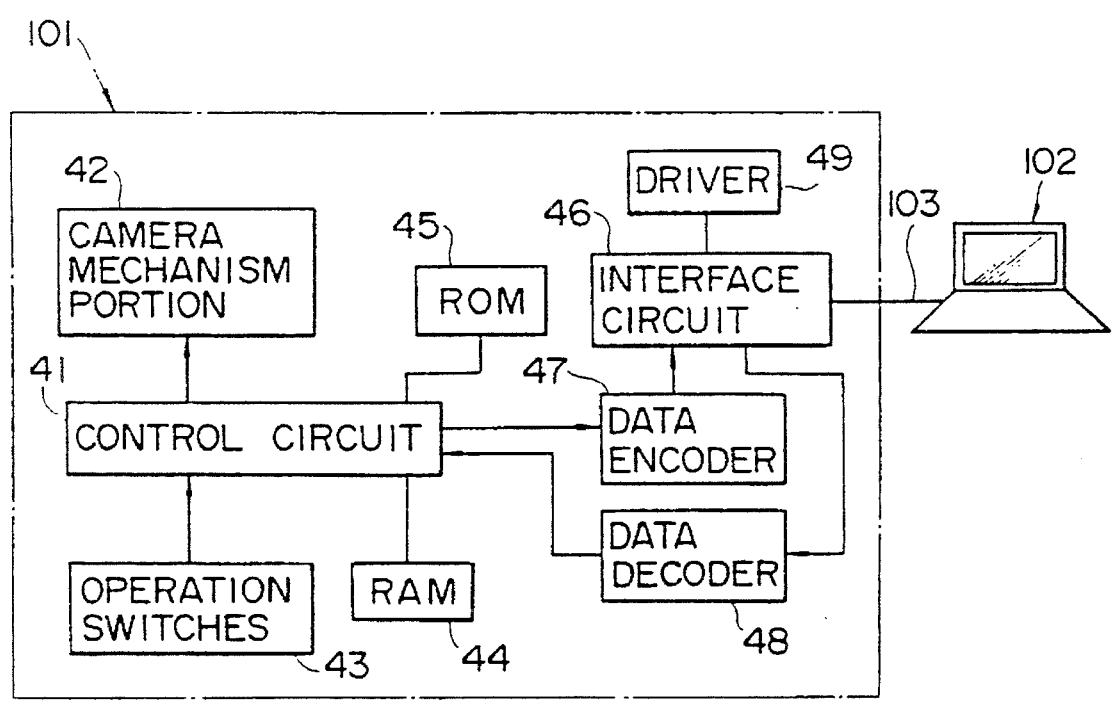
FIG. 10 is a block diagram showing interior constitutions of the camera main body in accordance with the fifth embodiment of the present invention.

As shown in FIG. 10, the camera main body 101 is equipped with not only mechanism portions which are compulsory constitutional members of the camera including a lens, a view finder, a shutter, a diaphragm, and so on, but also a control circuit for automatically controlling the mechanism portions in accordance with the setting data.

In FIG. 10, the interior constitutions of the camera main body 101 is shown by a block diagram. In the drawing, a control circuit 41 is provided for controlling overall operations of the camera main body 101 on the basis of a program pre-memorized in a ROM 45 connected thereto. Connected to the control circuit 41 is a camera mechanism portion 42 which is controlled thereby in response to a command from operational switches 43. The camera mechanism portion 42 includes a shutter, a diaphragm, a zoom mechanism for the taking lens and so on. Also connected to the control circuit 41 is a RAM 44 for memorizing data, which are required to operate the control circuit 41, as occasion demands.

Further, the camera main body 101 is connected with the computer 102 via the cable 103, and an interface circuit 46 acts as a modulation and demodulation apparatus to perform a data communication of setting data transmitted from the camera main body 101 and setting data transmitted from the computer 102. Moreover, a data encoder 47 is provided to encode the setting data into an appropriate data suitable in the case that it is fed to the computer 102, and a data decoder 48 functions to decode the transmitted data from the computer 102.

The interface circuit 46 is further connected to a driver 49 of a recording and reproducing device to which a recording medium such as an IC card, a floppy disk, a mini-floppy disk and so on is applied, wherein these recording mediums are used for recording the setting data.

Next, an operation of the above photographing apparatus constituted as described above will be explained. First of all, in case of a photographing by manual operation, the diaphragm, the shutter speed and so on are set by depressing the operation switches 43. In this case, the control circuit 41 controls the camera mechanism portion 42 in accordance with the setting data.

On the contrary, in case of an automatic adjustment on the basis of the setting data, the camera main body 101 and the computer 102 are come to be connected by the cable 103 to each other. If the floppy disk installed into the slot 124 of the computer 102 pre-memorizes the setting data, the setting data are fed to the control circuit 41 through the cable 103, the interface circuit 46 and the data decoder 48, and memorized in the RAM 44 under the control of the control circuit 41. The control circuit 41 then carries out an automatic adjustment of the camera mechanism portion 42 on the basis of the setting data.

It should be noted that the floppy disk can be installed, instead in the computer 102, in the driver 49 directly. In such a case, the cable 103 can be omitted. In other ward, the floppy disk itself becomes to accomplish or function portable data transmit/receive means.

The setting data memorized in the RAM 44 are displayed on the display unit 121 of the computer 102, and the user inputs new setting data through the keyboard 123 to renew the present setting data. In this case, the control circuit 41 performs this renewal operation and a memorizing operation in response to the input signal which is obtained by the operator through the keyboard 123.

The renewal and memorizing operation of the control circuit 41 is substantially the same as the first embodiment shown in FIGS. 3 and 4, therefore, the detail of the flow chart of the control circuit 41 is omitted in this embodiment.

The renewed setting data are reserved in the floppy disk or fed to the RAM 44 of the camera main body 101 through the cable 103. To perform renewal of the setting data, it may be possible to use the operation switches 43 for inputting the setting data instead of the keyboard 123. That is, in this case, the setting data are displayed on the display 121, and the renewed data input through the operation switches 43 of the camera main body 101 is fed to the computer 102 via the cable 103.

Though the number of the operation switches 43 is restricted, it may be possible to utilize the same switch so as to correspond to setting of a plurality of functions in such a manner that the computer 102 connected through the cable 103 can select the function of the operation switch 43 to be desirable one when required.

By the way, the photographing conditions being set can be, besides above ones, a setting timer of an auto power-off function, a frame number for continuous photographing, a zooming speed setting for a lens, an on- off setting of alarm, and so on. Moreover, though the transmit-receive means is the cable in this embodiment, it is not limited to the cable. That is, for example, a remote control type using an infrared oscillator and having a receiving portion which receives the infrared signal may be applicable in this invention.

As explained in the foregoing description, in accordance with the photographing apparatus of the present invention, the setting data are displayed, and the setting data displayed can be renewed, therefore, it is possible to take an optimum photograph which the photographer intends to take easily and in accordance with the various photographing conditions.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

The present disclosure relates to subject matters contained in Japanese Patent Application No. HEI 2-414199 filed on Dec. 26, 1990, and Japanese Utility Model Application No. HEI 2-404736 filed on Dec. 26, 1990, which are expressly incorporated herein by reference in their entirety.

What is claimed is:

1. An operational parameter setting apparatus for a photographing instrument, said photographing instrument being operable in a condition setable mode wherein operating parameters of said photographing instrument are manually set and a non-condition setable mode, wherein operating parameters of said photographing instrument are automatically set, comprising:

means for selecting between said condition setable mode and said non-condition setable mode;

means for storing a plurality of menu items corresponding to setable conditions for said photographing instrument and a plurality of sets of parameters, each set relating to a corresponding one of said menu items;

display means for displaying an image to be photographed by said photographing instrument and for displaying said plurality of menu items and said plurality of sets of parameters for said menu items when said condition setable mode is selected;

an indicator on said displaying means;

means for moving said indicator means on said displaying means to select a menu item and a parameter of the set of parameters corresponding to the selected one menu item; and means for storing data related to said parameter selected by said indicator means.

2. The invention in accordance with claim 1 wherein said displaying means includes:

a ROM in which is memorized an image of a selection picture plane for setting various functions and their operational modes;

a picture plane display circuit which outputs a video signal of the selection picture plane from the ROM; and a monitor which displays an image fed from the picture plane display circuit.

3. The invention in accordance with claim 1 wherein said moving means includes at least one operational switch.

4. The invention in accordance with claim 1 wherein said memory means includes a RAM which is installed in said photographing instrument.

5. The operational parameter setting apparatus in accordance with claim 1 wherein said display means is external to said photographing instrument.

6. An operational parameter setting apparatus for a photographing instrument, said photographing instrument being operable in a condition setable mode wherein operating parameters of said photographing instrument are manually set comprising:

means for storing a plurality of menu items corresponding to setable conditions for said photographing instrument and a plurality of sets of parameters, each set relating to a corresponding one of said menu items;

display means for displaying an image to be photographed by said photographing instrument and for simultaneously displaying said plurality of menu items and said plurality of sets of parameters for said menu items;

an indicator on said displaying means;

means for moving said indicator on said displaying means to select menu items and a parameter of the set of parameters corresponding to the selected menu items; and means for storing data related to said parameters selected by said indicator.

7. A method for controlling a photographing instrument having a display means for displaying an image to be photographed and a memory means in which is stored a plurality of menu items and a plurality of sets of parameters corresponding to said menu items, said method comprising the steps of:

displaying on said display means said plurality of menu items and said sets of corresponding parameters;

moving an indicator on said display to highlight selected ones of said plurality of menu items, one by one;

selecting from the set of parameters corresponding to a selected one of said menu items one of said parameters;

storing data related to said selected parameters in said memory means; and controlling said photographing instrument with said stored data.

8. The invention in accordance with claim 7 wherein said displaying step comprises displaying a menu picture plane of various functions and/or operational modes of said photographing instrument.

9. The invention in accordance with claim 7 wherein said cursor moving step is carried out by depressing an operational switch while viewing said display means.

10. The invention in accordance with claim 7 wherein said storing step comprises placing an operational mode of said photographing instrument into a RAM provided in said photographing instrument.

11. A photographing instrument system having a plurality of adjustable operational parameters comprising:

a photographing instrument operable in a condition setable mode wherein operating parameters of said photographing instrument are manually set and a non-condition setable mode wherein operating parameters of said photographing instrument are automatically set;

displaying means for displaying an image to be photographed by said photographing instrument and operable only when said photographing instrument is in said condition setable mode for displaying a plurality of menu items and said adjustable operational parameters, divided into sets to correspond to menu items;

means for selecting between photographing instrument modes;

means for selecting for each displayed menu item, a corresponding one of the associated set of said adjustable operational parameters, said selecting means including an indicator movable along said display to highlight, one by one, said operational parameters;

means for storing data related to said selected ones of said operational parameters; and means for controlling said photographing instrument based on said stored data.

12. A photographing instrument system having a plurality of adjustable operational parameters comprising:

a photographing instrument operable in a condition setable mode wherein operating parameters of said photographing instrument are manually set;

display means for displaying an image to be photographed by said photographing instrument and for simultaneously displaying a plurality of menu items and for each of said menu items, a set of associated said adjustable operational parameters;

means for selecting desired ones of said displayed menu item, and for each selected menu item a corresponding one of said adjustable operational parameters, said selecting means including an indicator movable along said display to highlight, one by one, said operational parameters;

means for storing data related to said selected ones of said operational parameters; and means for controlling said photographing instrument based on said stored data.

13. The apparatus in accordance with claim 12 wherein said selecting means comprises a number of keys, said number of keys being less than the least number of parameters corresponding to any one of said menu items.

14. The apparatus in accordance with claim 12 wherein each of said menu items is denoted by an alphanumeric symbol, each of said parameters is denoted by an alphanumeric and said selecting means comprises means for making an alphanumeric selection.

15. An operational parameter setting apparatus for a photographing instrument, said photographing instrument being operable in a condition setable mode wherein operating parameters of said photographing instrument are manually set and a non-condition setable mode wherein operating parameters of said photographing instrument are automatically set, comprising:

means for selecting between said condition setable mode and said non-condition setable mode;

means for storing a plurality of menu items corresponding to setable conditions for said photographing instrument and a plurality of sets of parameters, each set relating to a corresponding one of said menu items;

means for displaying an image to be photographed and said plurality of menu items and said plurality of sets of parameters for said menu items when said condition setable mode is selected, said displaying means being external to said photographing instrument;

an indicator on said displaying means;

means for moving said indicator on said displaying means to select a menu item and a parameter of the set of parameters corresponding to the selected one menu item; and means for storing data related to said parameter selected by said indicator.

* * * * *